July 12, 1938.  F. KUEHNEL  2,123,430
AUTOMOBILE TRANSMISSION
Filed Oct. 10, 1934  3 Sheets-Sheet 1

INVENTOR
Frank Kuehnel

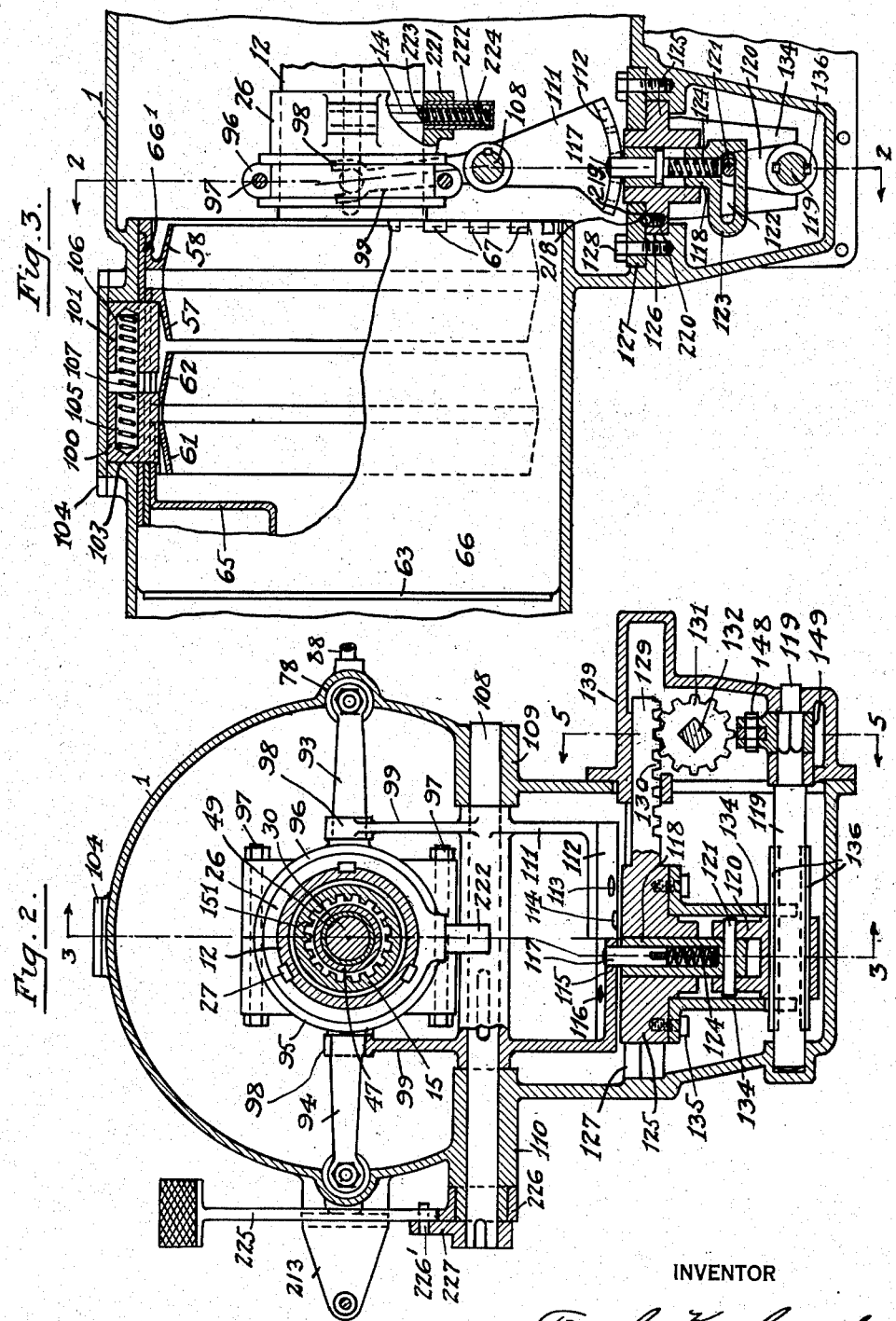

July 12, 1938.  F. KUEHNEL  2,123,430
AUTOMOBILE TRANSMISSION
Filed Oct. 10, 1934  3 Sheets-Sheet 3
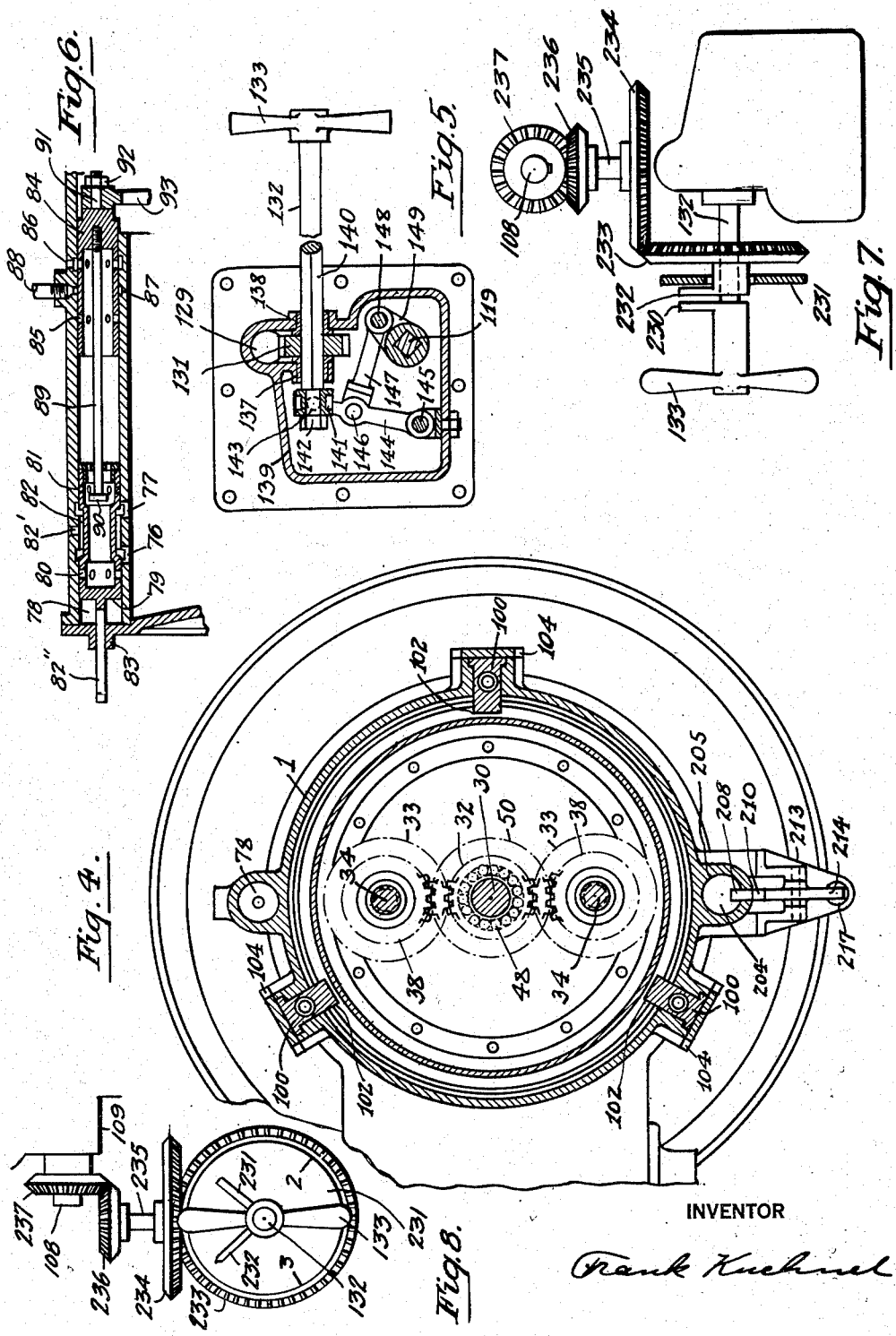
INVENTOR
Frank Kuehnel Patented July 12, 1938

2,123,430

UNITED STATES PATENT OFFICE 2,123,430

AUTOMOBILE TRANSMISSION

Frank Kuehnel, Detroit, Mich.

Application October 10, 1934, Serial No. 747,667

7 Claims. (Cl. 74—260)

My invention relates to transmissions for automobiles, trucks, and like vehicles, and its principal object is to provide a transmission in which the ratio or speed changes are operated and controlled by variations in the torque developed at the driving axle of the vehicle in conjunction with the normal fluctuations of the motor speed.

Another object of my said invention is to provide a transmission of the character referred to which, notwithstanding the automatic nature of its operation, may also be controlled by the operator when so desired so as to operate on any step in the speed range and may be locked in position to maintain it at a given ratio for any period.

A further object of my said invention is to provide a transmission which may be operated and controlled in a simple and effective manner without employment of the usual friction clutch or any analogous connecting and disconnecting means other than the necessary elements of the speed-varying mechanism.

With these and other objects in view, the invention consists in the improved construction, arrangement, and combination of parts which will be hereinafter fully described, reference being had to the accompanying drawings, which illustrate a preferred embodiment thereof, in which drawings—

Figure 2 is a transverse section taken in a vertical plane upon line 2—2 of Figure 3, certain details, however, being presented in elevation for the purpose of clearness.

Figure 3 is a section on line 3—3 of Figure 2, certain parts being also shown in elevation.

Figure 4 is a transverse section taken on line 4—4 of Figure 1 showing the general organization of the planetary gearing which constitutes an important part of my invention, and Figure 5 is a vertical longitudinal section taken on line 5—5 of Figure 2 illustrating details of certain manual controlling means to be hereinafter described. Figure 6 illustrates a detail.

Figures 7 and 8 are diagrams illustrating a method of checking the operation of the transmission, to be hereinafter described.

Figure 1:
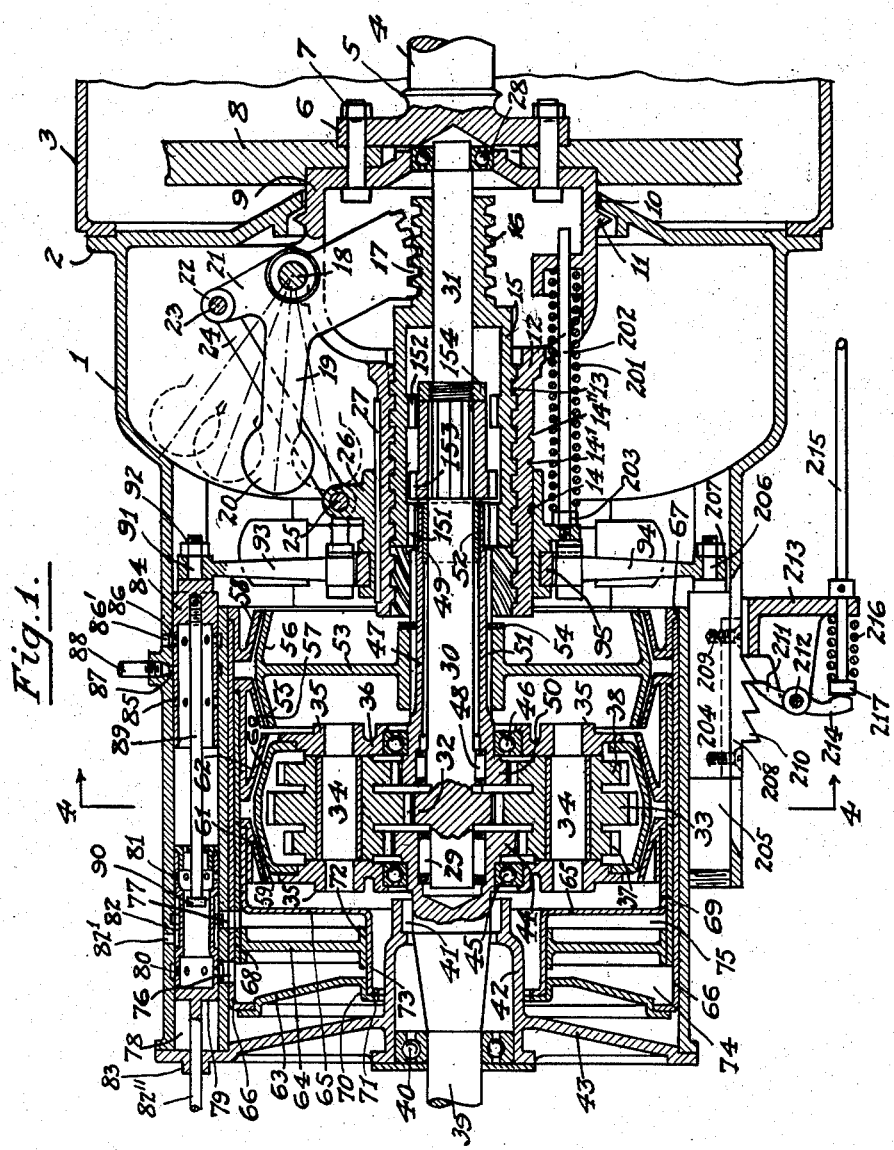
Figure 1 is a sectional plan view taken upon the main axis of the transmission.

1 is the housing having the flange 2 adapted for connection to a motor crank case 3 of any ordinary construction. 4 is the motor crank shaft supported in suitable bearings, not shown, and provided with an oil slinger 5 and with a flange 6 to which is secured by bolts 7 a flywheel 8 of any conventional design. To the flange 6 is connected also, by means of the bolt 7, a cylindrical casing 9 which projects through an opening 10 in the housing 1 and is provided with an oil slinger 11. Integral with the casing 9 is a sleeve 12, the inner periphery of which is provided with a quick pitch screw thread 13 and upon its outer periphery are the V-shaped grooves or notches 14, 14' and 14'' for a purpose to be hereinafter explained. Within the sleeve 12 is an internal sleeve 15 having at its rear end external high pitch screw threads adapted to engage the internal screw threads 13 of the sleeve 12, while upon its front end are the annular teeth 16 of rack-like contour adapted to engage with the toothed quadrant 17 which is pivoted at 18 to the casing 9. Integral with the quadrant 17 is an arm 19 upon the end of which is a weight 20, and also integral with the said quadrant is a short lever 21 having at its extreme end a bearing 22 within which is located a pivot pin 23. To the pin 23 is connected one end of a link 24, the other end of which is pivoted at 25 to a sleeve 26 slidably mounted upon the external periphery of the sleeve 12 but prevented from rotating in relation thereto by one or more keys 27 for a purpose to be hereinafter explained. Rotatably mounted at its front end in the ball bearing 28 in the casing 9, and at its rear end in the roller bearing 29, is the central shaft 30 having at its front end a reduced portion 31 which supports the internal sleeve 15, the said sleeve being rotatable and also slidable in relation to the shaft.

Integral with the shaft 30 is a pinion 32 with which meshes the central planetary pinions 33 rotatably mounted upon the pins 34, the reduced ends of which are carried in bosses 35 in the gear housing 36. In one piece with, or rigidly secured to, the pinions 33 are the pinions 37, 38, the pinions 37 being of a diameter considerably less than the central pinions 33, while the pinions 38 have a diameter intermediate between that of the pinions 33 and 37. Co-axial with the shaft 30 is the rear transmission shaft 39 rotatably mounted in the ball bearings 40 and in roller bearings 41, both of which are carried in the central hub 42 which forms part of the rear end cover 43 of the housing 1.

The shaft 39, as shown clearly in Figure 1, is bored at its end to receive the bearing 29 of the shaft 30, and upon its outer periphery is formed a pinion 44 which meshes with the planetary pinions 37, and to the rear of this pinion is a ball bearing 45 upon which is rotatably supported one side of the gear housing 36, the other side of which is supported upon a similar ball bearing 46, the latter being mounted upon a sleeve 47 which surrounds the shaft 30. The sleeve 47 is normally rotatable in relation to the shaft 30 and is supported at its rear end upon a roller bearing 48 and at its front end upon a bushing 49, both of which are in turn supported by the shaft 30. The sleeve 47 is provided at its rear end with a pinion 50 which meshes with the pinions 38 in the gear housing. Forward of the pinion 50 and bearing 46 the sleeve 47 has a series of teeth 51 extending throughout the greater part of its length forming an elongated pinion. The sleeve, however, has its diameter reduced below the bottoms of the teeth for a short distance from the front end of the sleeve, as indicated at 52. Upon the sleeve 47 is mounted a brake drum 53, the bore of which is formed as an internal gear having teeth engaging the external teeth 51 upon the sleeve so as to rotate with the said sleeve, while any endwise movement is prevented by the collar 54 which lies within an annular groove in the sleeve.

The external periphery of the brake drum 53 is formed of a pair of frusto-conical flanges 55, 56, and surrounding the said drum are a pair of annular brake bands 57, 58 adapted to engage the said brake drum when they are moved towards one another by means to be hereinafter explained. Upon the outer periphery of the gear housing 36 are a similar pair of frusto-conical members 59, 60 adapted to form a brake drum, and surrounding this drum are a pair of annular brake bands 61, 62 which are caused to engage the members 59, 60 in a manner to be hereinafter described. Rotation of the brake bands in relation to the housing is prevented by a series of sliding keys 100, 101, as shown in Figures 3 and 4, which engage in key-ways 102 cut in the outer peripheries of the bands. The keys 100 and 101 are slidably arranged within a pocket 103 in the housing and maintained in position by covers 104. Each of the keys is bored as at 105, 106 to receive a helical compression spring 107 which tends to hold the brake bands out of engagement with the co-acting surfaces upon the brake drum and the gear housing. In the present case three sets of the keys are shown, but any desired number may be employed. The keys, as shown more clearly in Figure 3, pass through the tubular members 66, 68 and 69 so that all these parts are held against rotation but capable of longitudinal movement.

Within the housing 1 and positioned between the end cover 43 of the said housing and the rear face of the gear housing 36 are a pair of annular discs 63, 65 adapted to form, in conjunction with one another, a cylinder, within which cylinder is a piston 64. The disc 63 is connected to a tubular sleeve 66 which is slidable endwise within the bore of the housing and extends forward until it meets the edge of the brake band 58 to which it is rotatively connected by a series of tongues 67 which engage in slots in the outer periphery of the band, as shown more clearly in the lower part of Figure 3. The sleeve 66 is also connected to the brake band 58 in a longitudinal direction by means of a round wire 66' which occupies an annular space cut half in the sleeve and half in the brake band. The piston 64 is connected to a tubular member 68 which is slidably mounted within the sleeve 66 and extends forward until it meets the front edge of the brake band 57 to which it is connected by means similar to that just described in regard to the sleeve 66 and band 58. The brake band 62 is rigidly connected to or formed integral with the brake band 57. The disc 65 is provided with a cylindrical sleeve portion 69 which is slidable within the tubular member 68 and is connected to the front edge of the brake band 61. The discs 63 and 65 are provided upon their inner periphery with internal flange members 70, 71, respectively, which are connected together and bored so as to leave a clearance between them and the outer periphery of the hub 42 upon the cover 43. The piston 64 is provided with an annular flange 72 which is bored to fit slidably upon the outer periphery of a boss 73, forming part of the disc 65.

By the construction above described, there are formed within the housing a pair of fluid pressure chambers 74, 75 which communicate, by means of the ports 76, 77, respectively, with the interior of a valve cylinder 78 formed integral with the housing 1. Within the rear portion of this cylinder is a piston valve 79 having within its periphery ports 80, 81 and a central reduced portion 82 which are adapted to co-act with the ports 76, 77. There is also a port 82' which communicates with the outer air. The valve 79 is provided with a stem 82" which extends through a boss 83 to the outside of the cylinder, as shown in Figure 1, where it is connected to a manually operated button or other device by which it may be controlled from the dash of the vehicle.

Within the forward portion of the cylinder 78 is a piston valve 84 having ports 85, 86 which are arranged to co-act with the annular port 87 connected by a pipe 88 to the vacuum system of the motor whereby is derived a powerful vacuum in either of the chambers 74, 75 through which it is intended to operate the piston 64 in a manner to be hereinafter described. Rigidly connected to the piston valve 84 is a rod 89 which extends rearwardly through the proximate end of the valve 79 and terminates in a head 90, which head, at certain periods during the operation of the mechanism, abuts upon the end of the valve 79 so as to limit its movement in relation to the co-operating valve 84.

While the operation of the piston valve 79 is effected manually through the rod 82", subject to limitation of movement imposed upon it by the rod 89, the valve 84 is connected by the shank 91 and nut 92 to the inner end of one of a pair of radial arms 93, 94 (see Figure 2) formed integral with the respective halves 95, 96 of an annular member rotatably mounted in a groove in the sleeve 26. The halves 95 and 96 are secured together by bolts 97 in the well known manner, and the inner ends of the arms 93, 94 are made of cylindrical cross section adapted to be engaged by the forked ends 98 of levers 99 through which the associated parts are moved endwise longitudinally as will appear hereinafter.

The levers 99 are keyed upon a rock-shaft 108 which is carried in bearings 109, 110 upon the housing, and integral with these levers is a quadrant 111, the lower transverse member 112 of which is formed as a segment of a cylinder. The member 112 is provided with openings 113, 114, 115, 116 and below the underside of the member 112 is a vertically slidable bolt 117 adapted to engage with any one of the said openings and lock the quadrant 111 together with the levers 99 and associated parts in any one of four positions in a direction longitudinally of the main axis of the transmission.

In order to obtain selectivity as regards the four positions just mentioned, the bolt 117 is mounted within a hollow sleeve 118, which sleeve is vertically reciprocable through the operation of a rock-shaft 119 upon which is keyed the crank 120 (see Figures 2 and 3) and this crank carries a pin 121 which engages a slot 122 in a lower extension 123 of the sleeve 118. The vertically movable sleeve 118 which carries the bolt 117 and also a helical compression spring 124 which constantly urges the bolt 117 in an upward direction, is carried in a sliding block 125, the said block being slidable in guideways 126 and held in position therein by gib members 127 and bolts 128. Integral with the block 125 is an extension 129 in which are cut rack-like teeth 130, and below the said extension is a pinion 131 mounted upon the shaft 132 and having teeth meshing with the rack teeth 130, so that by rotation of the shaft 132, together with its pinion, the block 125 may be moved back and forth so as to bring the pin 117 into position to engage any one of the openings 113, 114, 115, 116, as desired. In order to ensure the accurate location of the block 125 for this purpose there are provided upon the underside of the said block a series of depressions 218 in which engages a ball 219 urged upwards by the compression spring 220. Rotation of the shaft 132 is effected by a handle 133, shown in Figure 5, and in order to maintain the crank 120 at all times in proper alignment with the sleeve 118, there are provided upon the block 125 dependent angle members 134 which are secured to the block by screws 135 and having their opposed inner faces so spaced as to embrace the hub of the crank. The crank 120 is rotatively secured upon the shaft 119 by the long feather keys 136 as shown in Figures 2 and 3. Rotation of the shaft 119 is effected manually by means of the handle 133 upon the shaft 132 (see Figure 5) in the following manner—

The shaft 132, which, as before stated, carries the pinion 131, is mounted in bushings 137, 138 journaled in the extension 139 of the housing, and has a squared portion 140 by which it is rotatably coupled to the pinion 131, so that the shaft is normally rotatable within the housing and also slidable in the bushings. Upon the inner end of the shaft 132 is a grooved collar 141 secured in position by the nut 142, and within the groove this collar engages pins 143 in the forked upper end of the lever 144. The lever 144 is mounted upon the fixed pivot 145, and intermediate this pivot and the upper forked end is a pin 146 which is connected by a link 147 with a pin 148 upon the crank 149 carried upon the squared end of the shaft 119 (see Figures 2 and 5).

By the arrangement just described, it will be observed that rotation of the shaft 132 by the handle 133 will cause rotation of the pinion 131, and consequently, longitudinal movement of the block 125 carrying with it the locking pin 117, such movement having for its object the selection of the particular opening in which the pin is desired to engage. Furthermore, endwise movement of the shaft 132 through the handle 133 will cause partial rotation of the shaft 119, the effect of which is to move the sleeve 118 upward or downward through the action of the crank pin 121 and slot 122, thereby inserting or withdrawing the locking pin 117 as desired. It will be observed also that, due to the insertion of the spring 124 beneath the pin 117, the sleeve 118 may not be forced upward even though the pin 117 may not be positioned opposite any one of the holes. In this case the spring 124 will be compressed ready to force the pin into the opening which is presented to it.

In order to enable the operator to check the proper working of the mechanism just described, the handle 133, which is conveniently located upon the dash, may be provided with a pointer and dial, and a second pointer may be arranged in co-operative relation with the first pointer and operated by any suitable means from the levers 99 to indicate to the operator that the desired movement of the parts has been properly effected. Such an arrangement is shown diagrammatically in Figures 7 and 8, Figure 7 being a view corresponding to Figure 5 but looking from the opposite side, while Figure 8 is a section on line 8—8 of Figure 7. The handle 133 carries a pointer 230 arranged in co-operative relation with a fixed dial 231 and between the said pointer and dial is arranged a second pointer 232 carried upon a bevel gear 233 which is driven through bevel gear 234, shaft 235, and bevel gears 236, 237 from the rock shaft 108, the arrangement being such that when the handle 133 has been moved to produce a certain position of the block 125, and the block has been properly locked in said position, this fact will be indicated by the position of the pointer 232 which will coincide with that of the pointer 230, as will be understood.

The operation of the transmission is as follows:—The parts being in the relative positions shown in the drawings, in which they are locked in neutral position, with the exception of the piston valve 79 which will now be moved manually to its neutral position as shown in Figure 6. Under these conditions, the chambers 74, 75 are cut off from the vacuum system and connected with the outside air through the port 82'. At this moment the brake bands 57, 58, 61, 62 are held free of the drum and of the periphery of the housing 36 by means of the springs 107 acting through the keys 100, 101. The key 100 presses rearwardly against the edges of slots in the sleeves 66, 68, and 69 and at the same time against the rear wall of the pocket 103. The key 101 presses in the opposite direction against the opposed edges of the slots in the three sleeves just mentioned and also against the forward wall of the pocket 103.

The motor is now started and is adjusted to run at a relatively slow speed. The handle 133, Figure 5, is now pushed inward, moving over the crank 149, rotating the shaft 119 and through the crank 120 and pin 121 and slot 122 lowers the sleeve 118 and so withdraws the locking pin 117 from engagement with the face 112 of the quadrant 111.

At this moment the weight 20, having very little centrifugal force is moved inward through the action of the compression spring 201, (Figure 1) guided upon the rod 202, which spring exerts through nut 203, a rearward pressure upon the sleeve 26, and this pressure through the link 24, moves the arm 21 and through it the arm 19 which carries the weight, which then occupies the innermost position shown in broken lines in Figure 1.

By this movement the quadrant 17 through the rack 16 is caused to move the sleeve 15 forward until a series of internal teeth 151 engage with the teeth of a pinion-like clutch member 153 splined upon the shaft 30 and secured by the nut 154.

The shaft 30, 31 now rotates with the motor shaft and flywheel, being driven through casing 9, sleeve 12 and the clutch connection just described. As a result the pinion 32 causes rotation of the gear 33, and the gear 37, the latter rolling around the central pinion 44 which, due to the resistance of the vehicle, is held stationary, so that the entire housing 36 rotates freely in a direction opposite to that of the motor shaft. The rearward movement of the sleeve 26 as above described moves rearwardly also the arms 93, 94, and in this manner the piston valve 84 is also moved rearwardly so as to bring the port 86 in alignment with the port 87 communicating with the vacuum line, thereby supplying energy to the cylinder 78.

The piston valve 79 is then moved manually into the position shown in Figure 1, as a result of which the chamber 74 is connected to the vacuum system causing the piston 64 to move rearwardly while its cylinder moves in the opposite direction. In this manner the brake bands 61, 62 are caused to gradually engage the periphery of the housing and hold it stationary. The pinion 32 still rotating, now rotates the gear 33, and through the gear 37 rotates the central pinion 44 and with it the central shaft 39 causing the vehicle to move forward at slow speed.

During the primary acceleration of the vehicle the parts remain as above, but as the vehicle gains speed and the torque developed is reduced, motor speed increases. As a result the weight 20 is moved outward by centrifugal force and through the quadrant 17, moves the sleeve 15 rearwardly so that the teeth 151 slide into engagement with the teeth 51 of the sleeve 47. During this same movement the piston valve 84 is moved forward into the position shown in Figure 1, causing the port 86 to register with the opening 86' which communicates with the outer air and relieving the vacuum in the chamber 74. The spring 107 then causes release of the housing 36 from the brake bands 61, 62.

It will be observed that rearward movement of the sleeve 15, above explained, is in a helical direction due to its screw-like engagement with the screw thread 13 in the sleeve 12.

Engagement of the sleeve 15 with the sleeve 47 now causes rotation of the pinion 50 and through it the housing 36 which is now free.

The further movement of the sleeve due to continued acceleration causes the valve 84 to move forward until the port 85 registers with the vacuum port 87. This causes the brake bands 61, 62 to again engage the housing 36 and hold it stationary. In this condition of the mechanism the pinion 50 rotates the gear 38, and with it the gear 37 which drives the pinion 44 upon the shaft 39. The mechanism is now in intermediate speed.

The vehicle having gained momentum and the motor continuing to accelerate, centrifugal force of the weight 20 now causes the sleeve 15 to move further in a rearward direction, the teeth 151 sliding along the teeth 51 of the sleeve 47. (This further movement will not, however, take place unless the torque developed at the rear axle remains below a predetermined limit, since the action of the intermeshing screw threads will resist any longitudinal movement of the sleeve 15, as will be understood.) The teeth 151 finally reach the limit of their rearward movement and at this time the internal teeth 152 will be in engagement with the teeth of the member 153.

Just prior to this latter movement the piston 84 is moved further forward connecting ports 85 with the outer air through opening 86' so as to again release the brake bands 61, 62 from engaging with the housing 36. The housing now rotates as a unit carrying with it the rear shaft 39 at full motor speed. In other words, the vehicle is now in "high" speed.

In order to obtain a more definite location of the sleeve 26 in the several positions longitudinally of the sleeve 12, and to avoid unnecessary back-and-forth movement due to slight change in the motor speed, there is provided upon the sleeve 26 a boss 221, see Figures 2 and 3, bored internally to receive a sleeve 222 inside of which is the sliding pin 223 having a conical point adapted to engage either of the grooves 14, 14', 14" (see Figure 1) and hold the parts in relation frictionally by the action of the compression spring 224.

While normally the position of the sleeve 26 longitudinally of the sleeve 12 is determined by the speed of the motor, the same may be adjusted against the action of the centrifugal weights 20, on certain occasions, by the foot lever 225, the hub 226 of which is journaled upon the hub 110, and which engages a pin 226' fixed to a short lever 227 keyed to the rock-shaft 108. One of such occasions is when the vehicle is going down hill, the mechanism being in high gear, and it is desired to use the motor as a supplementary brake. In such case the mechanism may be instantly changed to intermediate speed although the motor may be racing. It will be noted that before operating the pedal, the block 125 must be moved into proper position by the handle 133, which is also manipulated so as to position the pin 117 for proper engagement with the quadrant 111.

The pedal 225 is so arranged that by moving it through its extreme stroke, the mechanism is changed to neutral, when all gears are disengaged, as shown in Figure 1.

It will be observed from the foregoing description of a complete cycle of operations, that through the action of the centrifugal mechanism and its associated elements the ratio of the transmission will be automatically changed back and forth due to acceleration or retardation of the motor speed, governed, however, by torque conditions which, through the quick pitch connection between the sleeves 12 and 15, tends to oppose the action of the centrifugal weight.

Assuming now that the vehicle running in high speed meets a hill condition which produces a higher torque, tending to overload the motor, the mechanism will automatically change to intermediate gear. During this period it is necessary to choke down the fuel supply to prevent the engine racing. This is effected automatically by means of the device shown in the lower part of Figure 1.

This device comprises a plunger 204 guided in a cylindrical bore 205 integral with the housing 1. This plunger has a shank 206 which is connected to the arm 94 by a nut 207. Within a groove in the plunger is a feather 208 held in position by screws 209 and this feather is provided with a series of ratchet teeth 210 adapted to engage a pawl 211 pivoted at 212 to the bracket 213. The pawl 211 is provided with a tail piece 214 which is in co-operative relation with the push rod 215, guided in the bracket 213. This push rod is normally held in the position shown by the compression spring 216 acting upon the head 217 of the rod. The rod is connected to the accelerator mechanism of the carburetor so that as the transmission is automatically moved into a lower gear, during which movement the plunger 204 moves rearwardly, one of the teeth 210 engaging the pawl 211 tilts the same over upon its pivot and pushes forward the rod 215, choking the fuel supply. This action continues until the pawl is sufficiently tilted to slip by the engaging tooth.

When it is desired to change the transmission into reverse, it is first put into low gear and locked therein by the handle 133 in the manner previously described. The piston valve 79 is then moved manually in a rearward direction to the neutral position, as shown in Figure 6, in which the portion 82 on the valve coincides with the ports 76, 77 and connects them with the outer air through opening 82' in the cylinder 78. The gear housing 36 is now released from the brake bands 61, 62 by the spring 107 through the keys 100, 101, and the gears 37 roll freely around the central pin 44, the vehicle standing still. The valve 79 is now moved rearwardly until the port 81 in the valve coincides with the port 77, connecting the chamber 75 with the vacuum system, which causes the brake bands 57, 58 to engage the brake drum 53, whereby the sleeve 47 and with it the pinion 50 is held stationary.

Due to the fact that the internal teeth 151 upon the sleeve 15 are at this time engaged with the pinion 153, the shaft 30, and with it the pinion 32, is rotating at motor speed, causing the gears 38 to roll around the pinion 50, the housing 36 turning in a direction opposite to that of the shaft 30. At the same time the gear 37, through the pinion 44, causes the shaft 39 to rotate in the opposite direction to the shaft 30 but at a slower speed, since the gear 37 is of smaller diameter than the gear 38. The vehicle is now in reverse as will be understood.

It will be observed that when the mechanism is in the condition just described, that is to say locked in low gear, a great convenience in operation results from the fact that by merely moving the piston valve 79 back and forth the vehicle may be driven in forward and rearward directions rapidly alternating, which is very effective in getting the vehicle out of a rut into which it may have dug itself, using the momentum of the vehicle for this purpose.

It will be observed also that if, when the mechanism is in intermediate gear, the operator inadvertently pulls the valve 79 into the extreme rearward position, engaging the bands 57, 58 with the drum 53, the result will be to stall the motor. In order to avoid this, there is provided upon the piston valve 84 the rod 89 extending through the rear of the piston valve 79 and terminating in the head 90. By this arrangement, when the motor is running at intermediate speed the valve 84 will be in such position that the valve 79 can be moved backwards sufficiently to bring it to the central or neutral position but not enough to cause reversal of the mechanism.

It should be remarked here that only one centrifugal weight 20 is shown in the drawings but it is obvious that two or more such weights with associated links 24 would preferably be employed, the same being arranged in equally spaced relation around the axis.

While I have herein described and shown a preferred embodiment of my invention, it will be readily understood by those skilled in the art that the same may be modified in various ways to meet any particular or peculiar requirement, without departing from the spirit of my invention. For example, although the transmission as herein described and illustrated is shown without the usual friction clutch as at present used in standard automobiles, I may in some cases employ any suitable form of clutch or disconnecting means between the flywheel and the transmission. In such cases the internal geared clutch member 152 will be eliminated and the shaft 31 will be connected directly to the disc member of a friction clutch, (for example), and the operating levers of the clutch will be connected by links or other means to the quadrant 17 so as to engage the clutch when the gearing passes from second to high gear.

In all cases I employ the combined action of speed-responsive means and torque-responsive means for the operation of my improved transmission.

Having thus described my invention, what I claim and desire to secure by Letters Patent of the United States is:

1. In an automobile transmission, the combination, with a main housing, of a gear casing rotatable within said housing; a planetary gear-set within said casing comprising three central pinions, one of which is connected to the propeller shaft, one to a central shaft adapted to be driven by the motor, and the other to a sleeve surrounding said central shaft and also adapted to be driven by the motor, and a plurality of sets of three planetary pinions journaled in said casing and meshing with said central pinions, each set being rotatively connected together or formed integral one with the other; brake means for holding said gear casing stationary; brake means for holding said sleeve stationary; clutch means for connecting said shaft and said sleeve alternatively with the motor shaft; speed responsive means for operating said respective brake means and said respective clutch means in proper sequence; and torque-responsive means for varying the effect of said speed-responsive means.

2. In an automobile transmission, the combination, with a main housing, of a gear casing rotatable within said housing; a planetary gear-set within said casing comprising three central pinions, one of which is connected to the propeller shaft, one to a central shaft adapted to be driven by the motor, and the other to a sleeve surrounding said central shaft and also adapted to be driven by the motor, and a plurality of sets of three planetary pinions journaled in said casing and meshing with said central pinions, each set being rotatively connected together or formed integral one with the other; brake bands adapted to engage said gear casing and hold the same stationary; a brake drum upon said sleeve; brake bands adapted to engage said drum and hold said sleeve stationary; clutch means upon said shaft and said sleeve; a hollow member surrounding said shaft and said sleeve and having clutch means adapted to engage the clutch means upon said shaft and said sleeve alternatively, said hollow member being driven from the motor shaft; and centrifugal speed-responsive means for operating said respective brake bands and for moving said hollow member in an axial direction to engage said respective clutch means in proper sequence.

3. In an automobile transmission, the combination, with a main housing, of a gear casing rotatable within said housing; a planetary gear-set within said casing comprising three central pinions, one of which is connected to the propeller shaft, one to a central shaft adapted to be driven by the motor, and the other to a sleeve surrounding said central shaft and also adapted to be driven by the motor, and a plurality of sets of three planetary pinions journaled in said casing and meshing with said central pinions, each set being rotatively connected together or formed integral one with the other; brake bands adapted to engage said gear casing and hold the same stationary; a brake drum upon said sleeve; brake bands adapted to engage said drum and hold said sleeve stationary; clutch means upon said shaft and said sleeve; a hollow member surrounding said shaft and said sleeve and having clutch means adapted to engage the clutch means upon said shaft and said sleeve alternatively, said hollow member being driven from the motor shaft; centrifugal speed-responsive means for operating said respective brake bands and for moving said hollow member in an axial direction to engage said respective clutch means in proper sequence; and torque-responsive means for varying the effect of said speed-responsive means.

4. In an automobile transmission, the combination, with a main housing, of a gear casing rotatable within said housing; a planetary gear-set within said casing comprising three central pinions, one of which is connected to the propeller shaft, one to a central shaft adapted to be driven by the motor, and the other to a sleeve surrounding said central shaft and also adapted to be driven by the motor, and a plurality of sets of three planetary pinions journaled in said casing and meshing with said central pinions, each set being rotatively connected together or formed integral one with the other; brake bands adapted to engage said gear casing and hold the same stationary; a brake drum upon said sleeve; brake bands adapted to engage said drum and hold said sleeve stationary; clutch means upon said shaft and said sleeve; a hollow member surrounding said shaft and said sleeve and having clutch means adapted to engage the clutch means upon said shaft and said sleeve alternatively, said hollow member being driven from the motor shaft; and centrifugal speed-responsive means for operating said respective brake bands and for moving said hollow member in an axial direction to engage said respective clutch means in proper sequence, said last-named means comprising a series of levers rotatively connected to the motor and provided with centrifugally operated weights, resilient means adapted to resist the centrifugal force of said weights, toothed members upon said levers engaging a complementary toothed member upon said hollow member, an outer sleeve surrounding said hollow member driven by the motor and arranged in driving relation with said hollow member, a collar slidably mounted upon said outer sleeve, link means connecting said levers to said collar, fluid pressure means adapted to operate said brake drums, and valve means controlling said fluid pressure means and actuated by said collar.

5. In an automobile transmission, the combination, with a main housing, of a gear casing rotatable within said housing; a planetary gear-set within said casing comprising three central pinions, one of which is connected to the propeller shaft, one to a central shaft adapted to be driven by the motor, and the other to a sleeve surrounding said central shaft and also adapted to be driven by the motor, and a plurality of sets of three planetary pinions journaled in said casing and meshing with said central pinions, each set being rotatively connected together or formed integral one with the other; brake bands adapted to engage said gear casing and hold the same stationary; a brake drum upon said sleeve; brake bands adapted to engage said drum and hold said sleeve stationary; clutch means upon said shaft and said sleeve; a hollow member surrounding said shaft and said sleeve and having clutch means adapted to engage the clutch means upon said shaft and said sleeve alternatively, said hollow member being driven from the motor shaft; centrifugal speed-responsive means for operating said respective brake bands and for moving said hollow member in an axial direction to engage said respective clutch means in proper sequence; and torque-responsive means for varying the effect of said speed-responsive means, said last-named means comprising a quick-pitch screw connection between said hollow member and its motor-driving element, whereby under predetermined torque conditions said hollow member will be moved axially in the opposite direction to that resulting from the said centrifugal means.

6. In an automobile transmission, the combination, with a main housing, of a gear casing rotatable within said housing and having upon its outer periphery a pair of opposed frusto-conical brake surfaces; a planetary gear set within said casing comprising three central pinions, one of which is connected to the propeller shaft, one to a central shaft adapted to be driven by the motor, and the other to a sleeve surrounding said central shaft and also adapted to be driven by the motor, said sleeve having thereupon a drum provided with a pair of opposed frusto-conical brake surfaces and also adapted to be driven by the motor, and a plurality of sets of planetary pinions journaled in said casing and meshing with said central pinions, each set being rotatably connected together or formed integral one with the other; a pair of brake bands having frusto-conical surfaces adapted to engage with the surfaces upon said gear casing; a pair of brake bands having frusto-conical surfaces adapted to engage said drum and to hold said sleeve stationary; said respective brake bands being slidably mounted within said housing and keyed against rotation in relation thereto, and having resilient means for releasing them from their respective coacting surfaces; clutch means for connecting said shaft and said sleeve alternatively with the motor shaft; speed-responsive means for operating said respective brake means and said respective clutch means in proper sequence; and torque-responsive means for varying the effect of said speed-responsive means.

7. In an automobile transmission, the combination, with a variable-speed gear-set of the selective type, of speed-responsive means for changing the ratio of said gear-set, torque-responsive means for controlling the operation of said speed-responsive means, and manually operated means for positively locking the transmission to operate at a predetermined ratio, said means comprising a driving member, a sliding collar upon said member adapted to effect changes in the gear ratio, an annular groove in said collar, a lever oscillably mounted upon a fixed pivot and engaging said groove, a quadrant upon said lever having therein a series of openings corresponding to the various ratios, and a manually operated bolt adapted to selectively engage said openings.

FRANK KUEHNEL.